(12) United States Patent
Raag

(10) Patent No.: US 11,238,594 B2
(45) Date of Patent: Feb. 1, 2022

(54) SIDEWALK EDGE FINDER SYSTEM AND METHOD

(71) Applicant: STARSHIP TECHNOLOGIES OÜ, Tallinn (EE)

(72) Inventor: Rasmus Raag, Tallinn (EE)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 0 days.

(21) Appl. No.: 16/388,581

(22) Filed: Apr. 18, 2019

(65) Prior Publication Data

US 2019/0318482 A1 Oct. 17, 2019

Related U.S. Application Data

(63) Continuation of application No. PCT/EP2017/075956, filed on Oct. 11, 2017.

(30) Foreign Application Priority Data

Oct. 24, 2016 (EP) .................................... 16195372
Oct. 11, 2017 (WO) ................. PCT/EP2017/075956

(51) Int. Cl.
  *G06K 9/00* (2006.01)
  *G06T 7/12* (2017.01)
  *G06T 7/73* (2017.01)

(52) U.S. Cl.
  CPC ............ *G06T 7/12* (2017.01); *G06K 9/00208* (2013.01); *G06K 9/00798* (2013.01); *G06T 7/73* (2017.01); *G06T 2207/10012* (2013.01); *G06T 2207/10028* (2013.01); *G06T 2207/30256* (2013.01)

(58) Field of Classification Search
None
See application file for complete search history.

(56) References Cited

U.S. PATENT DOCUMENTS

| 8,750,567 | B2 | 6/2014 | Zhang et al. |
| 10,068,336 | B1* | 9/2018 | Zhang .................. G06T 7/13 |
| 2008/0027591 | A1* | 1/2008 | Lenser ................. G05D 1/0251 |
| | | | 701/2 |
| 2013/0141520 | A1 | 6/2013 | Zhang et al. |
| 2013/0266175 | A1 | 10/2013 | Zhang et al. |
| 2013/0266186 | A1 | 10/2013 | Zhang et al. |

(Continued)

OTHER PUBLICATIONS

Kummerle ("Autonomous Robot Navigation in Highly Populated Pedestrian Zones", Journal of Field Robotics, Sep. 2014, pp. 1-31) (Year: 2014).*

(Continued)

*Primary Examiner* — Wei Wen Yang
(74) *Attorney, Agent, or Firm* — Siritzky Law, PLLC

(57) ABSTRACT

A method includes acquiring at least one image with at least one camera associated with at least one mobile robot; and extracting a plurality of straight lines from the at least one image; creating at least one dataset comprising data related to the plurality of straight lines extracted from the at least one image; forming a plurality of hypotheses for a walkway boundary based on the at least one dataset and determining at least one hypothesis with the highest likelihood of representing a walkway boundary; and using the at least one hypothesis to adjust a direction and/or speed of motion of the at least one mobile robot.

26 Claims, 6 Drawing Sheets

(56) References Cited

U.S. PATENT DOCUMENTS

2014/0277900 A1    9/2014   Abhyanker
2016/0011594 A1    1/2016   Chung et al.

OTHER PUBLICATIONS

Wijesoma, W. S. et al: "Laser-camera composite sensing for road detection and tracking," International Journal of Robotics and Automation, vol. 20, No. 3, Jan. 1, 2005.

Bauer, A. et al. "The Autonomous City Explorer: Towards Natural Human-Robot Interaction in Urban Environments," Int J of Soc Robotics (Apr. 2009) vol. 1, issue 2, pp. 127-140.

Starship Technologies, "Testing of Starship Autonomous Delivery Robots in Silicon Valley", Jul. 23, 2016 (Jul. 23, 2016), p. 1, Retrieved from the Internet: URL: https://www.youtube.com/watch?v=LCy7DIjSgv0.

Qing Li et al., "Lane boundary detection using an adaptive randomized Hough transform", Intelligent Control and Automation, 2004. WCICA 2004. Fifth World Congress on Hangzhou, China Jun. 15-19, 2004, Piscataway, NJ, USA, IEEE, US, Jun. 15, 2004, p. 4084.

WIPO, International Preliminary Report on Patentability Chapter I, PCT/EP2017/075956, dated Apr. 30, 2019 (10 pgs.).

WIPO, International Search Report, PCT/EP2017/075956, dated May 3, 2018 (4 pgs.).

WIPO, Written Opinion of the International Searching Authority, PCT/EP2017/075956, dated May 3, 2018 (9 pgs.).

European Patent Office (EPO), Office Action, dated Jul. 22, 2020 for application EP 17 780 767.4 [7 pgs].

\* cited by examiner

SIDEWALK EDGE FINDER SYSTEM AND METHOD

RELATED APPLICATIONS

This application is a continuation of filed PCT/EP2017/075956, filed Oct. 11, 2017, the entire contents of which are hereby fully incorporated herein by reference for all purposes. PCT/EP2017/075956 claims priority to EP 16195372.4, filed Oct. 24, 2016, the entire contents of which are hereby fully incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The invention relates to the field of autonomous navigation. In particular, the invention relates to autonomous navigation on walkways. Even more precisely, the invention relates to detecting boundaries of walkways.

INTRODUCTION

Recently, more and more tasks previously done by humans are being automated. This is an advantage, as robotic labor can be cheaper, more efficient, safer, more reliable and can free up human workers for less menial tasks. As such, it is advantageous to automate as many tasks as possible. One area where automation is desirable is the delivery business. With the advent of internet commerce, more and more purchases are done online Traditional delivery methods include transporting deliveries on the car roads, for example in trucks. This leaves open the problem of "last mile" delivery. Once the goods arrive to within a short distance of the final delivery location, it costs a disproportionately large amount to transport them that last distance with traditional methods. Combining the need for increasing automation and the "last mile" delivery problem, a joint solution can be implemented. For example, the last stretch of delivery can be performed by autonomous and/or semi-autonomous robots driving at slow speeds on pedestrian walkways.

Autonomous navigation is a challenging field of research. Vehicles, drones or robots moving on their own require multiple sensors and sophisticated software making use of the sensors' readings. In particular, autonomous motion on the ground can require estimating the boundaries of roads, walkways or paths travelled. In practice, this can mean that the readings of some of the sensors can be processed in such a way as to obtain an estimate of those boundaries. For example, autonomous cars often use Lidar (Light Radar) sensor readings to estimate lanes or road edges. On the pedestrian walkways, the task is slightly more challenging. This is due to the fact that the boundaries can be blurred or obscured. The presence of grass, cracks, small pebbles or dirt for example can add the complexity to estimating the boundaries. Therefore, different methods than the ones used for autonomous cars must be used.

U.S. Pat. No. 8,750,567 describes a method for detecting road edges in a road of travel for clear path detection. Input images are captured at various time step frames. An illumination intensity image and a yellow image are generated from the captured image. Edge analysis is performed. The line candidates identified in a next frame are tracked. A vanishing point is estimated in the next frame based on the tracked line candidates. Respective line candidates are selected in the next frame. A region of interest is identified in the captured image for each line candidate. Features relating to the line candidate are extracted from the region of interest and input to a classifier. The classifier assigns a confidence value to the line candidate identifying a probability of whether the line candidate is a road edge. The potential line candidate is identified as a reliable road edge if the confidence value is greater than a predetermined value.

US 2014/0277900 discloses a method and a system of a mapping search engine offering sidewalk maps, according to one embodiment. In one embodiment, a method of a sidewalk mapping server includes calculating a slope angle of a sidewalk transitioning into a street in at least one of a start location and an end location of the sidewalk in a neighborhood area and determining a transition characteristic of the sidewalk transitioning into the street. The transition characteristic is at least one of a grade-down transition, a grade-up transition, and a gradual transition in at least one of the start location and the end location of the sidewalk in the neighborhood area. A sidewalk map of a neighborhood is generated based on a calculation of the slope angle of the sidewalk transitioning into the street and a determination of the transition characteristic of the sidewalk transitioning into the street.

A paper by Bauer et. al, *The Autonomous City Explorer: Towards Natural Human-Robot Interaction in Urban Environments* touches upon the problem of sidewalk navigation briefly. The Autonomous City Explorer (ACE) project combines research from autonomous outdoor navigation and human-robot interaction. The ACE robot is capable of navigating unknown urban environments without the use of GPS data or prior map knowledge. It finds its way by interacting with pedestrians in a natural and intuitive way and building a topological representation of its surroundings.

It is an objective of the present document to overcome or alleviate the limitations of the prior art and to disclose a method and a system for detecting the boundary of pedestrian walkways using visual technology to assist autonomous navigation within an unstructured outdoor environment.

SUMMARY

The present invention is specified in the claims as well as in the below description. Preferred embodiments are particularly specified in the dependent claims and the description of various embodiments.

The above features along with additional details of the invention are described further in the examples below, which are intended to further illustrate the invention but are not intended to limit its scope in any way.

In a first embodiment, the invention relates to a method of identifying boundaries of a pedestrian walkway. The method comprises providing at least one mobile robot comprising at least one camera and taking an image with said camera. The method also comprises extracting a plurality of straight lines from the at least one image and creating at least one dataset comprising data related to the plurality of straight lines extracted from the at least one image. The method further comprises forming a plurality of hypotheses for a walkway boundary based on the at least one dataset and determining at least one hypothesis with the highest likelihood of representing a walkway boundary.

In a second embodiment, the invention relates to a system adapted for assisting navigation. The system comprises at least one mobile robot with at least one camera attached fixedly to it. The camera is adapted to take visual images. The system further comprises at least one processing component adapted to at least extract a plurality of straight lines from the at least one visual image. The processing component is also adapted to create at least one dataset comprising data related to the plurality of straight lines extracted from the at least one image. The processing component is also adapted to form a plurality of hypotheses for a walkway boundary based on the at least one dataset and determine at least one hypothesis with the highest likelihood of representing a walkway boundary.

In some embodiments, the straight lines can be extracted from the camera images by first applying an edge detector algorithm followed by a line extractor algorithm. The precise details of how this can be implemented can be found in EP15192649.0.

In some embodiments, the dataset comprising data related to the plurality of straight lines can be formed by projecting said lines on a certain projection plane. The dataset can then comprise the projected lines. The dataset can comprise the projected lines in the form of endpoints of said lines, that is the points defining the extremities of the lines. Note that the term "straight lines" as used in this document mostly refers to "line segments", or pieces of straight lines having endpoints. When an infinite straight line is meant, it is further clarified in the text. Note that some straight lines may not be projected onto the ground plane or may be "partially" projected. Depending on the precise mathematical nature of a projection plane, a given line may not have a corresponding projection on it. This is further discussed in conjunction with FIG. 2a.

In some embodiments, the projection plane can comprise a ground plane defined with respect to the robot. This ground plane can be recalculated at each point a new image is taken. As the robot moves, it takes a few images per second, such as 1 to 10 images per second, more preferably 2 to 8 images per second, even more preferably 3-6 images per second. The robot is adapted to move with a speed no more than about 10 km/h, such as about 8 km/h, more preferably such as about 6 km/h. Therefore, each second the robot can advance by between 1 and 2.5 meters. During this time, the ground plane can change significantly, for example if the robot is traversing uneven ground. Therefore, it is advantageous to recalculate the ground plane at least as often as the images are taken. In embodiments where the robot comprises at least one stereo camera system comprising two lenses, the ground plane can be calculated using data from said stereo camera system. Alternatively or additionally, the robot can comprise a light-based range sensor (i.e., a range sensor using light) and the ground plane can be calculated by using data from said light-based range sensor. The light-based range sensor may be one of a lidar, a time-of-flight camera and a laser range finder. In case a laser range finder is used, it may comprise one or more laser beams. The robot may also comprise a plurality of light-based range sensors, e.g. a plurality of laser range finders. The ground plane calculated using this method can be a local ground plane, i.e. it can be accurate a short distance in front of the robot, such as a few meters. If the robot is travelling over a flat surface, the ground plane can also be accurate over a longer distance. The ground plane can then be calculated each time following the extraction of straight lines from the at least one image.

In some embodiments, the plurality of hypotheses for a walkway boundary can be formulated or based on the data related to different subsets of straight lines extracted from the visual images. The subsets can comprise parts of the dataset comprising all data related to all the straight lines. For example, one subset can comprise data related to a single straight line, such as two endpoints of that line. One subset can also comprise data related to all of the straight lines comprised in the dataset. Naturally, one subset can comprise data related to any combination of the straight lines comprised in the dataset. Each hypothesis can therefore be based on data related to a different collection of straight lines belonging to the dataset. Note that in some embodiments, each hypothesis is based on a different collection of endpoints defining a collection of straight lines.

In some embodiments, each line can be categorized as either a left line or a right line with respect to the robot. This can for example be done by extending the straight line segment to an infinite line, calculating the shortest distance from such line to the robot and assigning the line either to the left or to the right based on which side the point of the shortest distance lies. In such embodiments, more than one type of hypothesis can be formulated. In such embodiments, left partial hypotheses can be made based on the lines to the left of the robot and right partial hypotheses can be made based on the lines to the right of the robot. A combination of a left partial hypothesis and a right partial hypothesis can comprise a full hypothesis. In such embodiments, likelihood values can be assigned to full hypotheses. Note that in such embodiments, the left partial hypotheses can correspond to the left edge of a walkway that is being modelled, and the right partial hypotheses can correspond to the right edge of the walkway. Combining such partial hypotheses can involve making assumptions on what can constitute a reasonable full hypothesis.

In some embodiments, the left and right partial hypotheses can be based on different collections of endpoints defining the straight lines belonging to the left and to the right of the robot respectively. For example, one left partial hypothesis can be based on two endpoints belonging to a left line. Similarly, another left partial hypothesis can be based on endpoints belonging to all of the left lines from the dataset. The same applies to right partial hypotheses. A full hypothesis can comprise a left partial hypothesis and a right partial hypothesis. For example, a full hypothesis can comprise a left partial hypothesis based on ten endpoints belonging to left straight lines and a right partial hypothesis based on two endpoints belonging to right straight lines.

In some embodiments, each partial hypothesis can be formulated by applying a linear regression algorithm to a different collection of points. Such points can comprise endpoints belonging to the extremities of straight lines. The points can further be assigned weights for the purpose of hypothesis likelihood calculation. Such weights can differ for at least two points. Such weights can depend on different parameters, for example on the distance of each point from the robot. An example of this method is given further below in the description.

In some embodiments the hypotheses can be assigned likelihood values based on a discrete and finite set of parameters. This can for example be done for the full hypotheses. However, likelihood values can also be assigned to partial hypotheses. The parameters on which likelihood values can be based can comprise the amount of points on which a hypothesis is based, the distance of the points on which a hypothesis is based from the robot. In embodiments where each hypothesis is based on a linear regression algorithm, parameters can further comprise the distance and/or the angle between the left and right partial hypotheses. In embodiments where the robot comprises at least two cameras and/or a stereo camera system comprising two lenses, parameters can also comprise the number of cameras agreeing on the same straight lines on which a hypothesis is based. For example, if a given line can be observed in more than one camera, that line, or rather its endpoints can be assigned a higher weight, and therefore hypotheses comprising the endpoints of this line can also get a higher weight.

In some embodiments, the robot can comprise at least two cameras. In such embodiments at least one camera can be forward-facing and at least one camera can be backward-facing with respect to the direction of motion of the robot. In other such embodiments, the at least two cameras can be sideways-facing with respect to the direction of motion of the robot, be it same side facing or opposite side facing.

In some embodiments, the robot can comprise a stereo camera system comprising at least two lenses. In such embodiments, the stereo camera system can be forward-facing with respect to the direction of motion of the robot.

In some preferred embodiments, the robot can comprise at least five cameras: one forward-facing camera, one forward-facing stereo camera system comprising two lenses, and two sideways-facing cameras, one on each side of the robot. In some preferred embodiments, the robot can comprise at least eight cameras: five as described directly above, two more sideways cameras (one on each side of the robot) and one backward-facing camera. In some further preferred embodiments, the robot may comprise at least nine cameras. In such embodiments, there may be two backward-facing cameras. In some embodiments, the two pairs of sideways-facing cameras can comprise two stereo camera systems.

In some embodiments, the boundary detection method can further comprise the robot navigating on a walkway at least partially by means of the identified at least one most likely walkway hypothesis. In such embodiments, the selected most likely walkway boundary hypothesis can be used as one of the inputs of the mobile robot's navigation procedure. Other inputs can also include odometry data, GPS data, and/or localization data based on visual localization methods, such as the one described in EP15192649.0.

In some embodiments, the method can further comprise using the at least one computed most likely walkway boundary hypothesis to adjust the direction and/or the speed of motion of the mobile robot. This can for example be implemented as follows: the mobile robot can be moving on some walkway. As it moves, it takes images with its one or more cameras. For each image, the method identifies the most likely walkway candidate, i.e. two more or less parallel lines separated by a reasonable distance (for example such as at least two meters). With the information about the most likely walkway candidate, the robot can be adapted to evaluate for example whether it is approaching an edge of the walkway, whether it is not moving straight, whether the walkway is turning and/or whether it is ending. The robot can then change its direction if, for example, it estimates that it is approaching one edge of the walkway. The robot can also change its speed if, for example, it notices that the walkway is turning.

The robot can further comprise a processing component adapted to implement at least part of the method. For example, the processing component can be adapted to extract the plurality of the straight lines from the camera image, create a dataset comprising data related to said images, form a plurality of hypotheses for a walkway boundary based on said dataset and/or determine at least one hypothesis with the highest likelihood of representing a walkway boundary. The processing component can further be adapted to implement all other optional parts of the method as described above and below.

In some embodiments, the processing component can comprise at least one CPU element and at least one GPU element. Some parts of the method can be performed on the CPU element and other parts on the GPU element. Some parts of the algorithm can be run concurrently. The method or the algorithm can be run in order described or otherwise.

In some embodiments, the mobile robot can be semi-autonomous. In such embodiments, the robot can be adapted to move or drive or travel autonomously for at least some periods of time. The robot can be adapted to drive mostly or substantially autonomously. For example, the robot can be adapted to travel autonomously for at least 50% of its total travelling time, such as about 60% of its total travelling time, such as about 70% of its total travelling time, such as about 80% of its total travelling time, such as about 90% of its total travelling time. In some embodiments, the robot can be adapted to transport deliveries from one location to another. In such embodiments, the robot can be adapted to autonomously travel on walkways. The robot can be adapted to be controlled when, for example, crossing a busy street. In such embodiments, the robot can be controlled by a remote operator when traversing difficult ground (such as a car street) and to drive autonomously otherwise.

In some embodiments, the robot can have a width in the range of 20 to 100 cm, preferably 40 to 70 cm, such as about 55 cm. The robot can have a height in the range of 20 to 100 cm, preferably 40 to 70 cm, such as about 60 cm. The robot can have a length in the range of 30 to 120 cm, preferably 50 to 80 cm, such as about 65 cm. The robot can have a weight in the range of 2 to 50 kg, preferably 5 to 40 kg, more preferably 7 to 25 kg, such as 10 to 20 kg. In embodiments where the robot is a delivery robot, the total weight of the robot comprising the deliveries can be about 10 to 25 kg.

The term walkway can refer to traversable regions of ground such as sidewalks, pedestrian paths, footpaths, passages, tracks or trails. The term walkway boundary or walkway edge can refer generally to the transition between the walkway and the adjacent area whether it be a road, a car road, or terrain such as grass, rocks, sand, snow, ice, and other possible terrains generally more difficult to traverse than the walkway. The walkway edge or walkway boundary can also refer to the transition between the walkway and a generally vertical obstacle such as a fence, a building, a cliff or other manmade or natural obstacles.

The terms semi-autonomous robot and mostly autonomous robot can refer to a robot adapted to operate autonomously for at least some part of its operation time, preferably a large part of its operation time. In a preferred embodiment, the robot may be adapted to operate autonomously for at least 60% of its operation time, more preferably for at least 70% of its operation time, even more preferably for at least 80% of its operation time.

The term "straight line" or "line" can refer to line segments and not infinite lines in the below text. A person skilled in the art can infer from the context which one is meant.

Below is an overview of one way to implement the invention.

Walkway Finding Overview

1. Straight line segments are extracted from simultaneous frames from each camera. This can be done using methods described in EP15192649.0 "Method and system for autonomous localization and mapping" which is fully incorporated herein by reference.

2. A dataset relating to the straight line segments can be created. This dataset can comprise a projection of the extracted line segments on a plane. This plane can for example be the ground plane with respect to the robot. The lines from all cameras can be projected to this ground plane. Not all lines can be projected onto the ground plane and some lines can only be partially projected.
3. Walkway hypotheses can be created based on how well the lines on the ground plane match with each other.
4. Best walkway hypothesis is selected based on a certain score or likelihood. The calculation of the score or likelihood can depend on several factors or parameters. Multiple high scoring walkway hypotheses could be output.

Below is one possible implementation of obtaining one walkway hypothesis that can then be compared with other walkway hypotheses obtained in a similar manner In a preferred embodiment, each walkway hypothesis contains two subsets of line segments: left and right line segments. The left line segments can form a subset called L and the right line segments can form a segment called R. Each subset (L and R) contains zero or more line segments. Line segments can be defined by their endpoints.

A line segment that is to be compared to a given hypothesis can be first assigned to either L or R. This is based on whether the line segment, when extended to a line of infinite length, passes the robot from the left or from the right. This is further explained and demonstrated in FIG. 2B below. In case the line does neither (the horizon, for example), it can be treated separately and/or not considered.

Next, all line segment end points are fitted to a mathematical model of two parallel lines. There are different possible models to describe two parallel lines. One of the models that can be used is the weighted linear least squares model, described below. A person skilled in the art will realize that this part of the invention can also be implemented differently.

A 2D line can be described by the equation y=ax+b, where a and b fully determine the line and (x, y) is a point on the line. Equations $y=ax+b_L$ and $y=ax+b_R$ describe two parallel lines, which will be called the left line and the right line below. The equations are mathematically equivalent to the following equations $$y=ax+1b_L+0b_R$$

$$y=ax+0b_L+1b_R$$

where a, $b_L$ and $b_R$ fully describe the two parallel lines.

$$\vec{A} = \begin{pmatrix} a \\ b_l \\ b_r \end{pmatrix}$$

is the vector of parameters that describes the two parallel lines. Then, all points (x, y) on the left line satisfy the equation $y=\vec{A}\cdot\vec{x}_{L'}$, where $$\vec{x}_{L'} = \begin{pmatrix} x \\ 1 \\ 0 \end{pmatrix}.$$

Similarly, all points on the right line satisfy the equation $y=\vec{A}\cdot\vec{x}_{R'}$, where $$\vec{x}_{R'} = \begin{pmatrix} x \\ 0 \\ 1 \end{pmatrix}$$

The present invention aims at obtaining lines best fitting measured data points (i.e., the endpoints of obtained line segments). From all these points in L and R, an overdetermined system of equations can be constructed:

$$y_{L_0} = \vec{A}\cdot\vec{x}_{L'_0}$$
$$y_{L_1} = \vec{A}\cdot\vec{x}_{L'_1}$$
$$y_{L_2} = \vec{A}\cdot\vec{x}_{L'_2}$$
$$...$$
$$y_{L_N} = \vec{A}\cdot\vec{x}_{L'_N}$$
$$y_{R_0} = \vec{A}\cdot\vec{x}_{R'_0}$$
$$y_{R_1} = \vec{A}\cdot\vec{x}_{R'_1}$$
$$y_{R_2} = \vec{A}\cdot\vec{x}_{R'_2}$$
$$...$$
$$y_{R_N} = \vec{A}\cdot\vec{x}_{R'_N}$$

Where $\vec{x}_{L'_i}=[x_{L_i}, 1, 0]$ and $\vec{x}_{R'_i}=[x_{R_i}, 0, 1]$. The matrix form of the system of equations is $\vec{Y}=X\vec{A}$, where $$\vec{Y} = \begin{pmatrix} y_{L_0} \\ y_{L_1} \\ ... \\ y_{L_N} \\ y_{R_0} \\ y_{R_1} \\ ... \\ y_{R_N} \end{pmatrix}$$

$$X = \begin{pmatrix} x_{L_0} & 1 & 0 \\ x_{L_1} & 1 & 0 \\ ... & ... & ... \\ x_{L_N} & 1 & 0 \\ x_{R_0} & 0 & 1 \\ x_{R_1} & 0 & 1 \\ ... & ... & ... \\ x_{R_N} & 0 & 1 \end{pmatrix}$$

and A is unknown.

Solving the matrix equation (there are several standard ways to do it), $\vec{A}$ can be obtained, which defines the two parallel lines that fit the data best for a given particular hypothesis. To see how well the solution fits the data, the residual vector $\vec{R}=\vec{Y}-X\vec{A}$ is calculated. The biggest element of $\vec{R}$ is a measure of how badly the worst-fitting point fits the two parallel lines. If this element is above a certain threshold (that can be determined experimentally and/or adjusted as necessary), then the data does not fit very well to two parallel lines. In case this element corresponds to the error from a new line added to this hypothesis, this newly added segment does not fit well with this particular sidewalk hypothesis.

In a preferred embodiment, all line segment end points are not considered in the solution with an equal weight, because the end points have different uncertainties associated with them. When 2D points on a camera frame are projected onto the ground plane, the points with larger distances from the robot also have larger distance uncertainties. To account for the different uncertainties, the distant points should have less influence on the solution than the points closer to the robot. In other words, different data points should have different weights.

The matrix equation $\vec{Y}=X\vec{A}$ can then be modified to include weights $W\vec{Y}=WX\vec{A}$, where W is a diagonal matrix with elements of the diagonal being the weights for each data point. The inverse of the distance between the point and the robot can for example be used as the weight for that point.

When looking at the residuals to find the points that fit the model the worst, the distant points should be allowed to deviate more from the model than the points close to the robot, because the locations of distant points are not known with a high certainty. This can be done by adding weights to the residual calculation equation: $R=W(\vec{Y}-X\vec{A})$. Note that weights can also include other factors apart from the point distances from the robot.

The described model has certain limitations. For example, the line equation y=ax+b cannot describe a line parallel to the y axis. To overcome the problem, the axes x and y can be swapped, and the equations solved again. In this way it can be checked if this model fits the data better. (This is for example useful if the robot is standing perpendicular to the walkway. In this case, the walkway would appear precisely as a line parallel to the y axis). The better fitting model from the two can be used for determining the worst fitting point. If the residual of that point is above a certain threshold, the newly added line is determined to not fit the sidewalk hypothesis.

BRIEF DESCRIPTION OF THE DRAWINGS

The skilled person will understand that the drawings, described below, are for illustration purposes only. The drawings are not intended to limit the scope of the present teachings in any way.

DESCRIPTION OF VARIOUS EMBODIMENTS

In the following, exemplary embodiments of the invention will be described, referring to the figures. These examples are provided to provide further understanding of the invention without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps.

Figure 1:
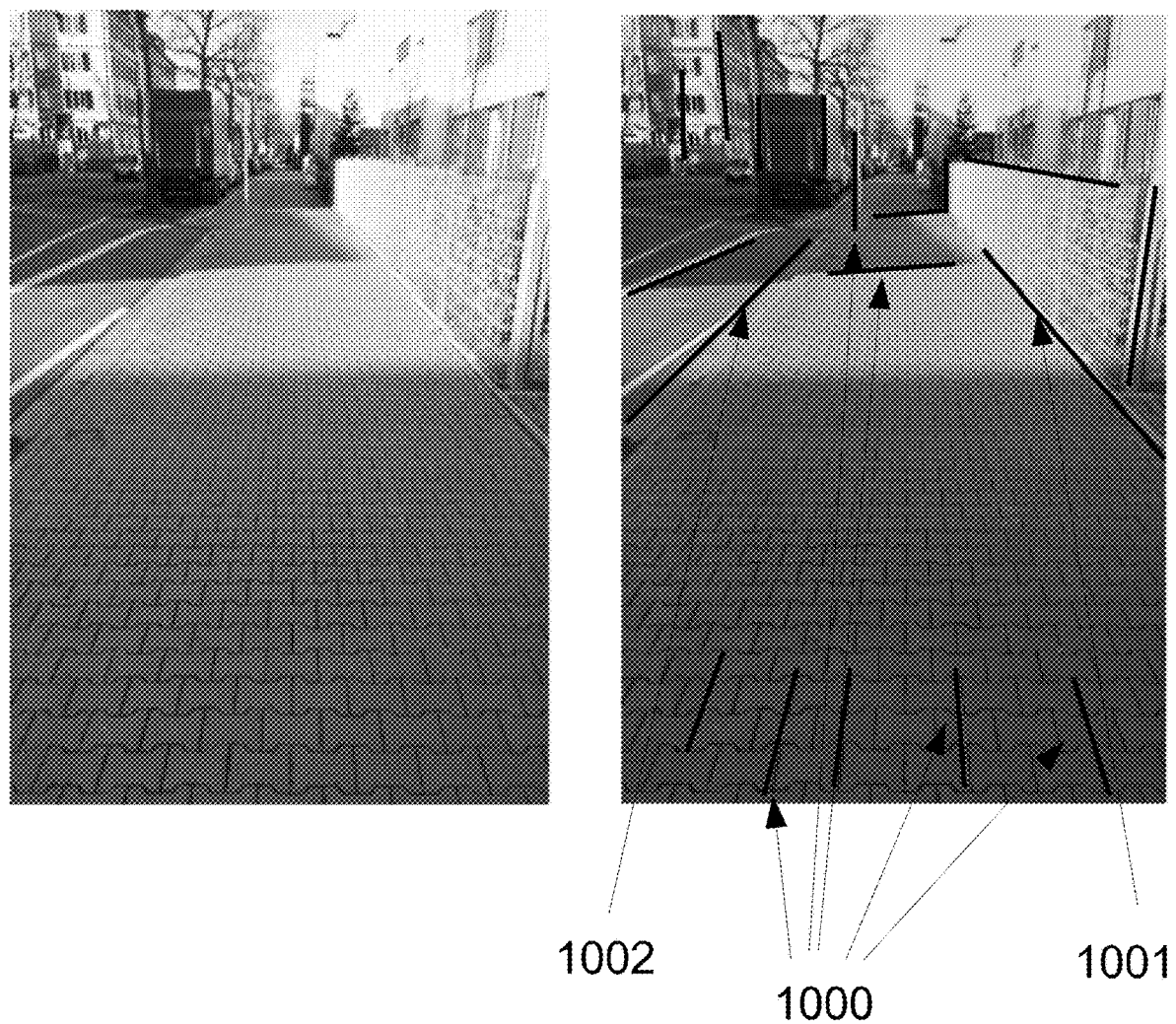
FIG. 1 demonstrates the extraction of straight lines from images to be used in the invention disclosed herein.

Referring to FIG. 1 an exemplary image from one camera of cameras of a robot 100 is shown. On the left hand side, an original image is shown and on the right hand side, an image with extracted straight lines 1000 is shown. The straight lines can be extracted by a combination of an edge detector algorithm and a line extractor algorithm as described in detail in the application EP15192649.0. The straight lines 1000 can belong to buildings, cars, roads, fences and other objects. For the purposes of the current invention, in particular lines 1001 and 1002 may be of interest. It is clear that they at least partially correspond to walkway edges and will likely yield partial and full walkway hypotheses. Note that FIG. 1 demonstrates an image as captured by the camera. Therefore, the extracted straight lines 1000 will be first projected on the ground plane and only then form walkway hypotheses.

As will be appreciated, while the lines 1001 and 1002 are straight and parallel to one another in the "real world", their representation on the image depicted in FIG. 1 is no longer parallel to one another. Instead, in the perspective view of FIG. 1, these lines 1001, 1002 come closer to one another the higher the location on the picture in FIG. 1 is (i.e., the further the location is displaced from the camera taking the picture in the real world). To obtain further information from such a picture, the two dimensional picture needs to be projected to the ground.

Figure 1B:
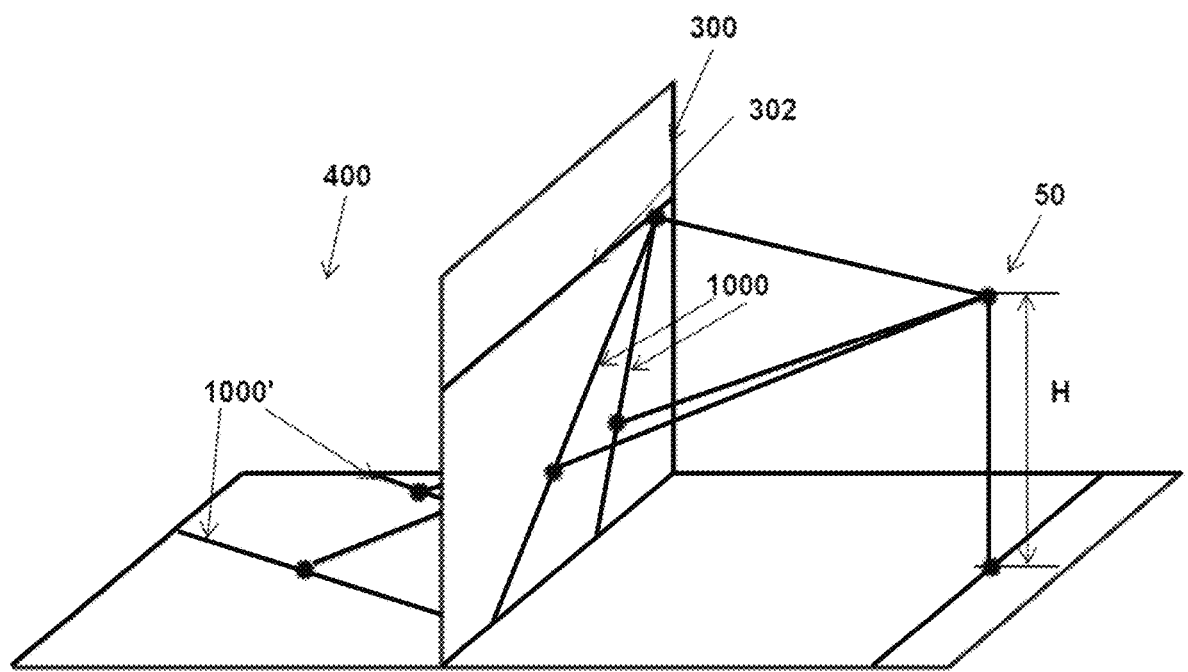
FIG. 1b illustrates an exemplary projection of a picture onto the ground plane.

This is illustrated in FIG. 1b. FIG. 1b depicts a picture generally corresponding to the image depicted in FIG. 1 with reference numeral 300. Picture 300 is generated from the real world situation generally carrying the reference numeral 400. With regard to FIG. 1b and the accompanying description, it is noted that the particular case of a camera 50 being directed horizontal (i.e., parallel to the ground plane) is described. While this is a particular case, it is instructive for the understanding of the present technology and the skilled person knows how to adapt the calculations for different camera angles. In that regard, it is noted that the camera 50 may actually have other orientations relative to the ground plane, or equivalently, the ground plane can be oriented in different ways relative to the camera. Further, the relative orientation between the camera 50 and the ground plane may change for each successively captured images. With reference to FIG. 1b, in the real world situation 400, there are two lines 1000' (such as borders of a street or a walkway) running in parallel to one another. As discussed above, the representation 1000 of these lines 1000' in the perspective picture 300 are no longer in parallel to one another, but they merge at horizon 302. Picture 300 is taken by camera 50. In the present technology, one starts with perspective picture 300 and desires to arrive at a representation of the real world situation 400, i.e., at a projection of the perspective picture 300. This may be accomplished by also knowing the height H of the camera 50. Generally speaking, when an object is located on the ground, the higher an object is in picture 300 (put differently: the closer it is to the horizon 302), the further it is displaced from camera 50 in the real world. Such a projection of a picture 300 onto the ground to arrive at a representation of the real word works well for objects located on the ground. As discussed, the distance of the object from the horizon in the picture (or, put simply: how high it is located on the picture) is a measure of the distance between the camera 50 and the object in the real world. Said distance may be indicated by a coordinate, such as the x-coordinate. Furthermore, it will be understood by those skilled in the art that an object's representation in the picture 300 is smaller the further it is removed from camera 50 in the real world. For example, the distance of the lines 1000 in the picture 300 (representing real world lines 1000') becomes smaller the closer the lines get to horizon 302 in picture 300, although in a real world situation 400, these lines have a constant separation distance. However, by obtaining the x-coordinate of an object (as described above), one obtains the distance between an object and the camera 50. By means of this distance and the above described rationale (the greater the distance x, the smaller the objects appear in picture 300), one may also infer the extension of objects in directions perpendicular to x. The other horizontal extension may be identified as the y-coordinate and the vertical dimension may be identified as the z-coordinate. Thus, by means of a simple projection, one may arrive at a two (if only the x- and y-coordinate are of interest) or three dimensional data set of the surroundings of camera 50, when starting with picture 300 and knowing the height H of the camera.

However, this only works for objects located (that is: having a section) below the height H of the camera 50. Imagine, for example, that an object (e.g., a roof) would be located above the height of the camera 50. In the picture 300, the representation of such an object would be located above the horizon 300. Thus, by the described procedure, it would not be possible to allocate an x- and y-coordinate to such an object.

Figure 2A:
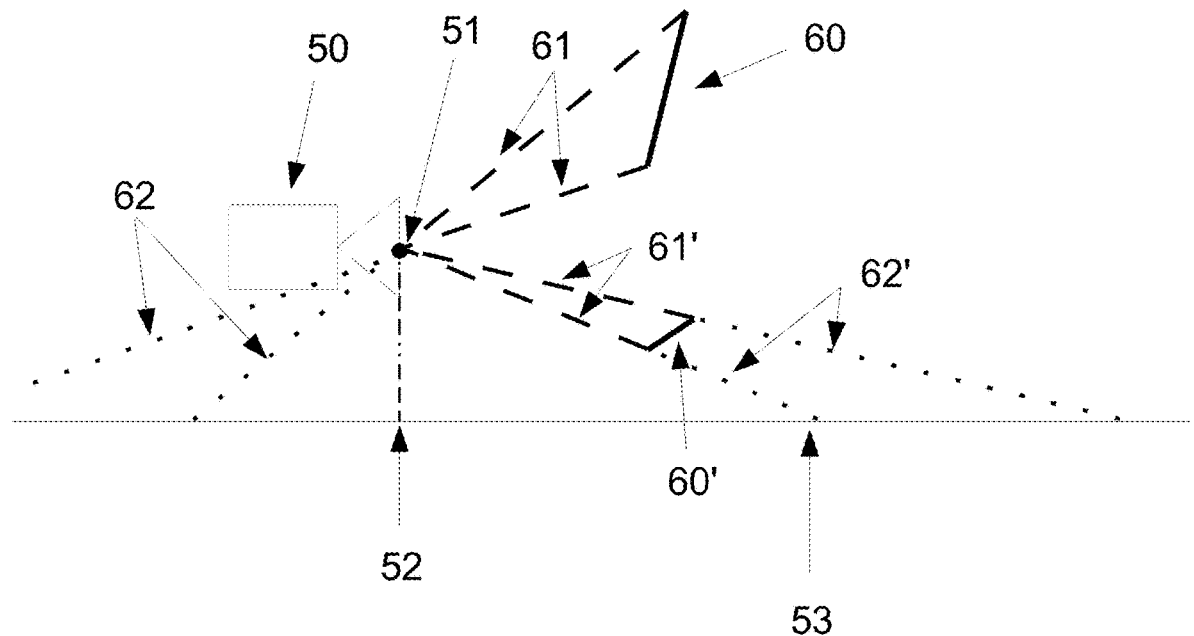
FIG. 2a schematically demonstrates failure of line projection on the ground plane in accordance with the present invention.

This is further illustrated in FIG. 2a. FIG. 2a schematically shows how line projection on the ground plane can fail or succeed. In practice, such failure is likely to happen for lines belonging to rooftops, buildings and/or vertical objects. Schematic camera 50 has its pinhole 51 and the corresponding pinhole projection 52 on the ground plane 53. Any line with a projection falling to the right of the pinhole projection 52 (i.e. in front of the camera) can be successfully projected on the ground plane 53, while the projection fails for lines whose projection falls to the left of the pinhole projection 52 (i.e. behind the camera). Again, this rationale corresponds to an object being above or below the height H of a camera 50. When an object is above the height of the camera 50, a line connecting the camera 50 with the object will intersect the ground "behind" the camera, while, when an object is below the height of the camera 50, a line connecting the camera 50 with the object will intersect the ground "in front of" the camera. The projection will fail when an object is above the plane that is parallel to the ground plane 53 and that passes through the pinhole 51. An exemplary line 60 is shown. For example, line 60 may correspond to a roof Dashed lines 61 show the projection lines corresponding to the line 60, i.e., the lines connecting endpoints of line 60 to the pinhole 51 of the camera 50. They originate on the pinhole 51 and end on the respective endpoints of the line 60. Imaginary projection lines 62 demonstrate that the projection of line 60, i.e. the places where the projection lines 61 should intersect the ground plane 53 would fall to the left of the pinhole projection 52, thus indicating that the projection on the ground plane 53 fails for line 60. A further exemplary line 60' is also depicted, which line 60' is below the plane defined by the height of the camera 50. Dashed lines 61' and projection lines 62' demonstrate how these lines intersect the ground plane 53 to the right of the pinhole projection, thus indicating that the projection is successful for line 60'. In other words, projecting each of the endpoints of the lines 60, 60' on the ground plane 53 amounts to finding a 3D line connecting the pinhole 51 and an endpoint of the respective line 60, 60' and locating the intersection point of this 3D line and the ground plane 53. Projection is then successful if this intersection point has a positive x-coordinate for an x axis defined by the pinhole projection 52 at the origin and pointing towards the direction of motion of the robot.

As discussed, if a robot is located on a perfectly horizontal surface, lines (or generally, objects) located vertically below the pinhole 51 can be successfully projected on the ground plane, and lines (or generally, objects) located vertically above the pinhole 51 will fail to be projected (i.e. the projection will fall to the left of the pinhole projection 52). However, if a robot is on an inclined surface, this is not the case anymore. In fact, when for example travelling on a steep hill, the hilltop is higher than the cameras, but features on it will be still projected to the ground plane 53, because the ground plane 53 itself also rises (i.e. ground is not level).

Note, that if line projection fails, a partial projection can still be possible. This means that if a certain subsection of a line can be projected on the ground, it can be used instead of the full line. Imagine, for example, a skew beam having a first end below the height of the camera 50 and a second end above the height of the camera 50. Then, the first end can be projected onto the ground, while the second end cannot. However, there may be an intermediate point of the skew beam which also can be projected onto the ground. Thus, by above described routine, the x and y coordinates for the first end of the beam and for the intermediate point can be derived. That is, generally, if, for example, one endpoint can be projected on the ground plane 53 and the other cannot, it can be possible to choose a different point on the line to serve as a new endpoint. This new endpoint can be closer to the endpoint that can be projected on the ground plane 53. If this new endpoint can be projected on the ground plane, the resulting shortened line segment can be used, otherwise the procedure can be repeated until projection is possible.

Figure 2B:
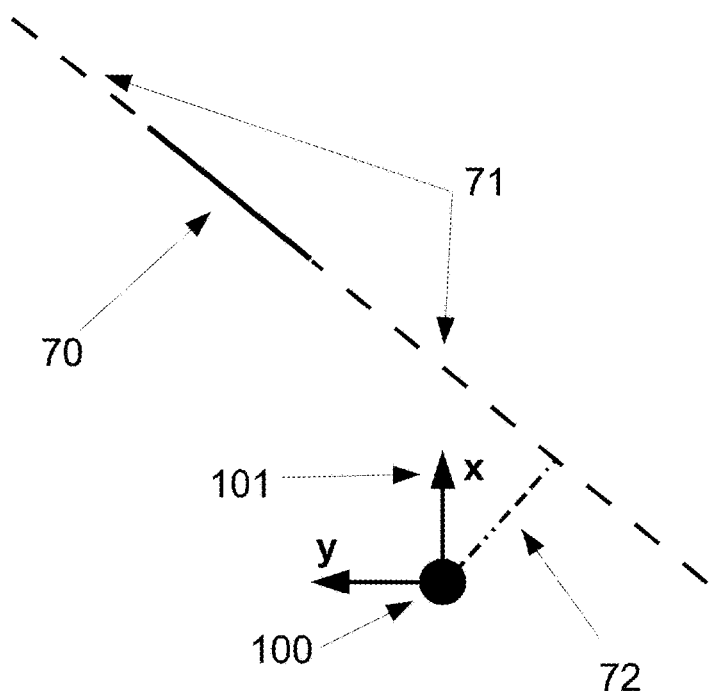
FIG. 2B schematically demonstrates classifying lines as being to the right or to the left of the robot in accordance with the present invention.

FIG. 2B schematically shows classifying the lines extracted from camera images into lines to the left and to the right of the robot 100. In a preferred embodiment, the coordinate system x-y can be defined by the robot 100 at the origin and the direction of robot movement defining the x axis 101. Note that in a preferred embodiment, the x axis 101 coincides with midline 2 discussed in conjunction with FIG. 3 below. The detected line 70 is considered as an infinite line 71 extending in both directions. After this, it is trivial to identify the line segment 72—the shortest distance between the robot 100 and the infinite line 71. This line segment can either lie to the left or to the right of the x axis 101 (or put, differently, to the left or to the right of the midline 2), and therefore to the left or to the right of the robot 100. Note that in the physical world it would be almost impossible for the line segment 72 to lie directly in the direction of the x axis 101, but if it does (for example in the case of the horizon), it can arbitrarily be assigned either to the left or to the right of the robot, or not assigned to either. Since the hypotheses can be checked again after rotating the ground plane by 90°, this line would be taken into account during this later check.

Figure 3:
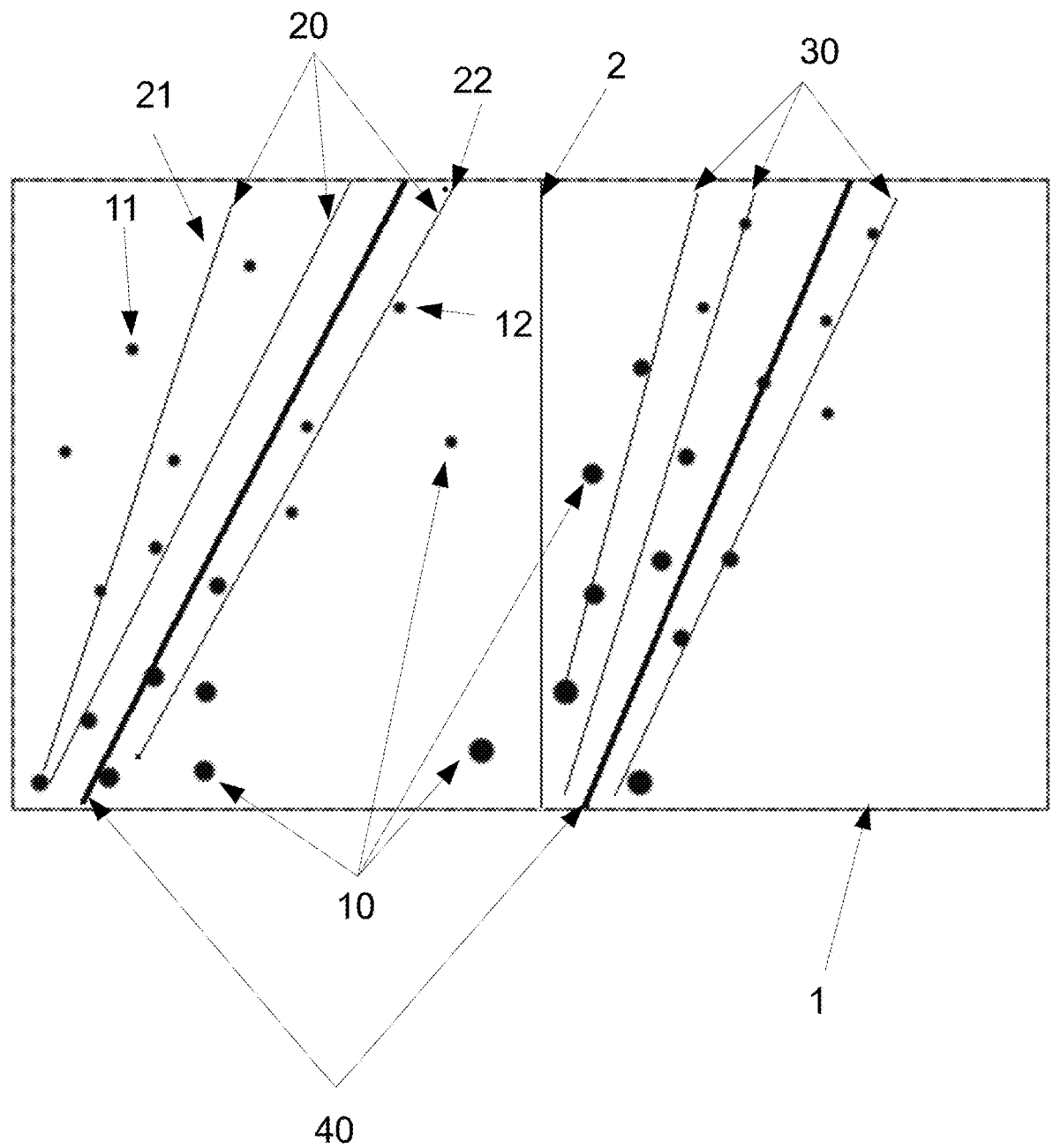
FIG. 3 demonstrates schematically locating boundaries of a walkway in accordance with the present invention.

Referring to FIG. 3 an exemplary schematic embodiment of using an embodiment of the invention is shown. One exemplary snapshot of the ground plane 1 is depicted. As discussed above, the described routine starts by a camera taking picture, such as the picture depicted in FIG. 1a. Straight lines are extracted from such a picture and such straight lines are projected onto the ground plane as described in conjunction with FIG. 1b. Thus, one arrives at the x- and y-coordinates of such lines. For further processing, the endpoints 10 of such lines are used, which endpoints 10 are depicted in FIG. 3. In other words, straight lines extracted from the images taken by the cameras on the robot can be projected on the ground plane as two points corresponding to the beginning and to the end of the line, denoted also endpoints 10. Some straight lines may not be projected on the ground plane. This has been previously described and discussed in conjunction with FIG. 2a. The ground plane 1 can comprise projected endpoints 10 from a plurality of cameras, since the relative position of the cameras can be known to a very high precision. The midline 2 denotes the separation between the left and right parts of the ground plane 1. In one embodiment, the midline 2 can be defined with respect to the center and direction of motion of the robot. A skilled person will appreciate that the midline 2 can be an abstract concept useful to describe the invention, but not necessarily part of it. In one embodiment, the midline 2 can correspond to an x axis of a coordinate system centered on the robot (with the origin potentially located at the front facing camera) and pointing towards the robot's direction of motion. As discussed, the midline 2 may be used to assign lines to the left or to the right of the robot 100: If the extension of a line (that is, each line segment detected by the robot can be extended to a line passing through the detected line segment; this is referred to as the extension of a line) passes the robot 100 (i.e., comes closest to the robot 100, or, equivalently, has its point minimizing the distance between the robot 100 and the line) left of the midline, said line is identified as a line left of the robot 100 and vice versa. For further processing, different weights may be assigned to the endpoints 10. For example, the weights may be assigned according to the distance from the robot, the closer points having a higher weight. This helps offset the larger error associated with endpoints located further away from the robot. This is demonstrated in the figure by different sizes of the endpoints 10.

A left partial hypothesis 20 and a right partial hypothesis 30 can be formed each time a line (or rather its endpoints projected on the ground plane 1) does not fit an existing left partial hypothesis 20 or a right partial hypothesis 30 respectively. For example, it is clear that the endpoints 11 and 12 should not belong to the same left partial hypotheses, and lead to the creation of two distinct left partial hypotheses 21 and 22. The left partial hypotheses 20 can be obtained only using endpoints 10 to the left of the robot 100 and the right partial hypotheses 30 can be obtained only using endpoints 10 to the right of the robot 100—see the above description of FIG. 2B for one example of how to define what is left and right of the robot 100. Full hypotheses 40 can be created by an addition of at least one line (or rather, its projected endpoints 10) from the right side to a left partial hypothesis or vice versa. Further, full or partial hypotheses can be created when a line does not fit with an existing full hypothesis 40, but fits with either the left partial hypothesis 20 or the right partial hypothesis 30. This is further illustrated and discussed in conjunction with FIG. 3b. A full hypothesis 40 calculation assumes that the boundaries of a walkway should be parallel and under this assumption computes how much the endpoints comprising it or new ones to be added or rejected differ from the parallel assumption. Note that more than one full hypothesis 40 can be formed, but for clarity purposes only one is shown in FIG. 1. In this way, a partial sidewalk hypothesis 20, 30 contains at least one line segment (or rather its projected endpoints 10), and a full sidewalk hypothesis 40 contains at least one left line segment and at least one right line segment. When a full sidewalk hypothesis 40 is formed, new endpoints potentially fitting into it are tested for fitness not just on their respective left or right side, but with the whole full hypothesis 40.

Figure 3B:
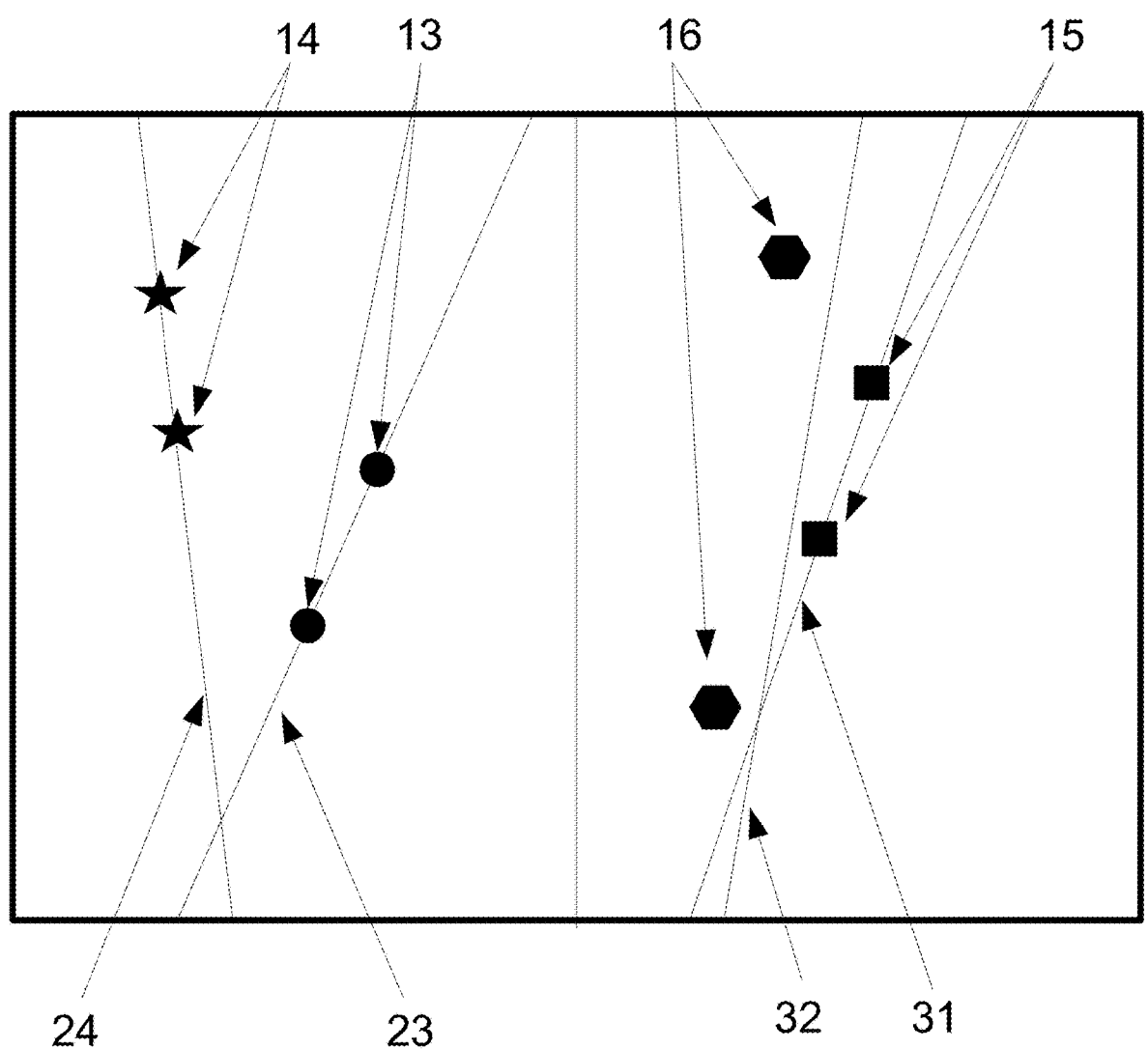
FIG. 3b demonstrates one way of forming hypotheses for the walkway boundary.

FIG. 3b demonstrates how hypotheses are formed. Below, one way of obtaining partial hypotheses is described—a skilled person will understand that other ways are possible and may be preferable.

First, a first line is selected at random from the set of all the lines successfully projected on the ground plane. This first line lies either in the left subset or in the right subset (i.e. when extended to an infinite line, it passes the robot either on the left or on the right respectively). Say this first line belongs to the left subset. As it is the first line considered, there are no existing partial hypotheses, and so a first left partial hypothesis 23 is created for this line. This first left partial hypothesis 23 then comprises the two first endpoints 13 from the first projected line.

Next, a second line is selected at random from the remaining set of the projected lines. Say this second line also belongs to the left subset. The second line can either fit with the first left partial hypothesis 23 within a certain tolerance, or not. In the first case, this line is added to the first left partial hypothesis, and this hypothesis is then adjusted to the one representing a best fit for all four endpoints comprising the hypothesis. In the second case, as shown in the figure, a new second left partial hypothesis 24 is generated fitting the second endpoints 14 of the second line.

Next, a third line is selected at random from the remaining set of the projected lines. Say this third line belongs to the right subset. A first right partial hypothesis 31 is then created for this third line. The first right partial hypothesis comprises the third endpoints 15. This first right partial hypothesis 31 can either be compatible within a certain tolerance with one of the existing left partial hypotheses 23, 24 or not. If it is not, no full hypothesis is generated. If it is, as in the figure, a full hypothesis is generated comprising one left partial hypothesis and one right partial hypothesis. In this case, the first left partial hypothesis 23 and the first right partial hypothesis 31 can comprise a full hypothesis.

Next, a fourth line is selected at random from the remaining set of the projected lines. Say this fourth line belongs to the right subset. Again, it is checked whether this fourth line, or rather its endpoints 16 fit with an existing right partial hypothesis. If it is the case, as in the figure, the partial hypothesis is adjusted, as to fit all of the endpoints comprising it optimally, including the fourth endpoints 16. This is demonstrated in the figure with the second right partial hypothesis 32—it is generated based on all four endpoints comprising it (in this case endpoints 15 and 16). When a new line is added to an existing partial hypothesis and this partial hypothesis is adjusted based on it, the previous partial hypothesis (in our case first right partial hypothesis 31) can be discarded in order to reduce computational time. This, however, is not a necessary step.

The procedure then continues until all of the lines in the set of the projected lines have been considered. A skilled person may notice that the outcome of this method of hypothesis generation can strongly depend on the order in which the lines are randomly selected. To avoid missing potentially good walkway hypotheses, this method can be iterated a few times, resulting in a different order of lines selection and potentially yielding different partial and/or full hypotheses.

A skilled person will understand that many other ways of generating partial hypotheses exist. For example, all possible subsets of the projected lines can be considered, and a partial and/or full hypothesis generated for each subset. This, however, can be computationally demanding. Further, other methods of eliminating subsets of the projected lines set can be considered.

Figure 4:
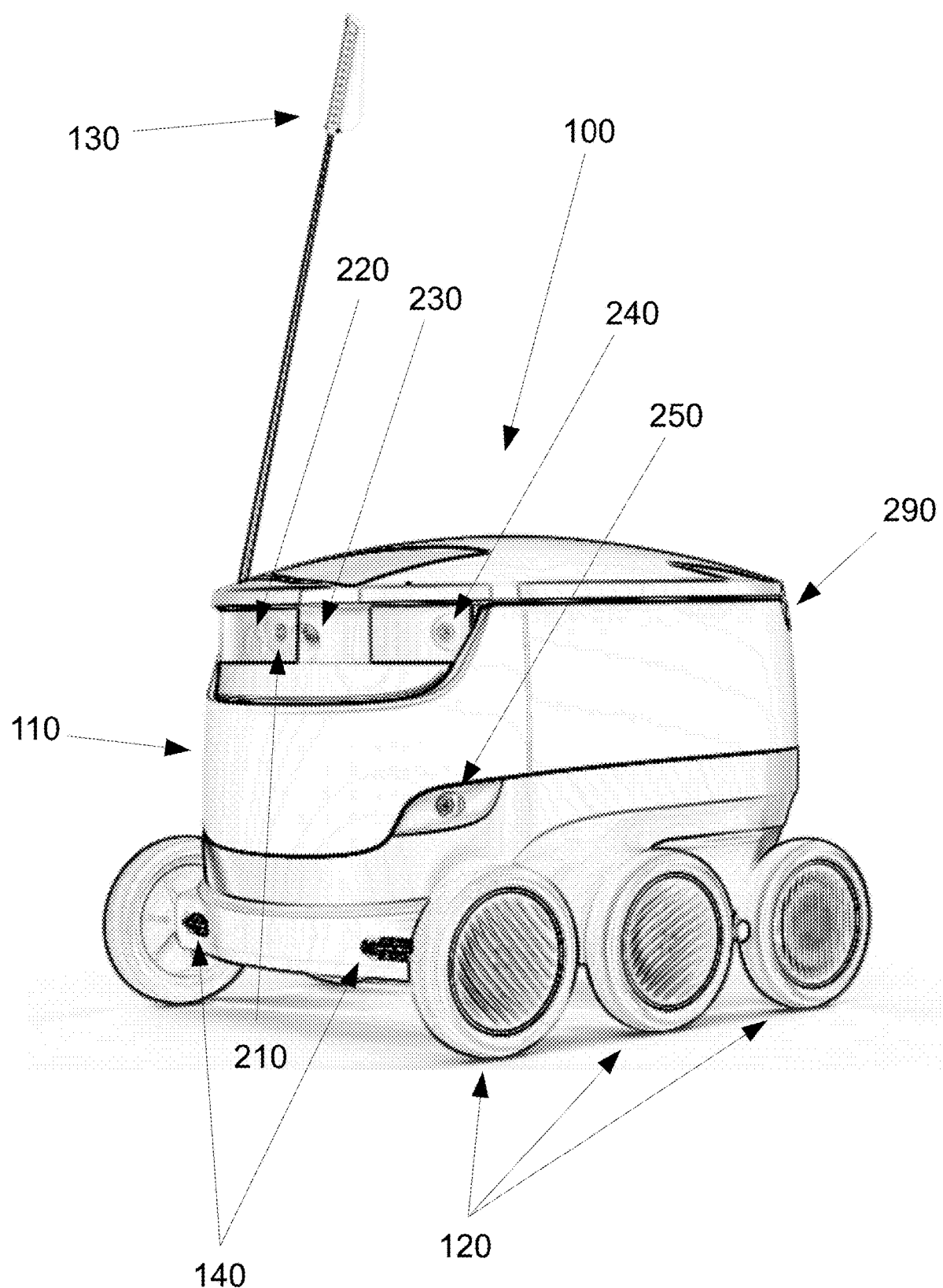
FIG. 4 demonstrates an exemplary embodiment of a mobile robot adapted to implement the walkway detection method.

FIG. 4 demonstrates an exemplary embodiment of a mobile robot adapted to implement the walkway detection method. The mobile robot 100 comprises a body 110 which in turn comprises a compartment for a delivery. The robot further comprises wheels 120, a flagpole or stick 130 used to increase the visibility of the robot, lights 140 and cameras 210, 220, 230, 240, 250, 260 (not shown), 270 (not shown), 280 (not shown), and 290. In some embodiments, the flagpole 130 can be an antenna. One camera can be a front camera 210. The front camera 210 can be generally forward facing. The cameras may also comprise front, side and/or back stereo cameras 220, 230, 240, 250, 260, 270, 280. The front stereo cameras 220 and 230 can be slightly downward facing. The side stereo cameras 240 and 250, as well as 260 and 270 (not shown) can be forward-sideways facing. The back stereo cameras 280 (not shown) and 290 can be generally backward facing.

In certain embodiments, the relative position of the cameras 210, 220, 230, 240, 250, 260 (not shown), 270 (not shown), 280 (not shown), and 290 are known. Therefore, the images from all of the cameras can be projected on the same ground plane. Lines detected by multiple cameras within a certain tolerance are more reliable than lines detected by one camera. The more cameras have detected a certain line, the more reliable this line is considered to be. Therefore, hypotheses comprising such lines detected by multiple cameras are considered to have more weight.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

I claim:

1. A method comprising:
   (a) acquiring at least one image with at least one camera associated with at least one mobile robot;
   (b) extracting a plurality of lines from the at least one image acquired in (a);
   (c) creating at least one dataset comprising data related to the plurality of lines extracted from the at least one image in (b);
   (d) forming a plurality of hypotheses for a walkway boundary based on the at least one dataset and determining at least one hypothesis with a highest likelihood of representing a walkway boundary; and
   (e) using the at least one hypothesis determined in (d) to navigate the at least one mobile robot,
   wherein a line extracted in (b) is categorized as either a left line or a right line with respect to the at least one mobile robot;
   the method further comprising:
   (f) making a left partial hypothesis based on the lines to the left of the at least one mobile robot and a right partial hypothesis based on the lines to the right of the at least one mobile robot;
   (g) combining the partial hypotheses to make a full hypothesis, and
   (h) assigning a likelihood value to said full hypothesis,
   wherein the at least one dataset is formed by projecting the extracted lines on a certain projection plane, and wherein the certain projection plane comprises a ground plane defined with respect to the at least one mobile robot, and
   wherein, for each particular line projected onto the ground plane, two points are extracted, corresponding to endpoints of the particular line, and each of the partial hypothesis is based on a different collection of such points,
   wherein each of the partial hypothesis is formulated by applying a linear regression algorithm to a different collection of points; and
   the method further comprising:
   (i) assigning weights to the points for partial and full hypotheses likelihood calculation, the weights differing for at least two points,
   wherein the weights depend on a distance of the points from the at least one mobile robot.

2. The method of claim 1, wherein the hypotheses are assigned likelihood values based on a discrete and finite set of parameters.

3. The method of claim 2, wherein said parameters comprise one or more of: (i) a number of points on which a particular hypothesis is based, (ii) a distance of points on which a hypothesis is based from the at least one mobile robot, (iii) a distance between a left partial hypothesis and a right partial hypothesis, (iv) an angle between a left partial hypothesis and a right partial hypothesis, and/or, when the at least one mobile robot comprises at least two cameras, (v) a number of cameras agreeing on the same lines on which a hypothesis is based.

4. The method of claim 1, wherein the at least one camera comprises at least two cameras, and wherein a first at least one camera is forward-facing with respect to a direction of motion of the at least one mobile robot, and wherein a second at least one camera is backward-facing with respect to said direction of motion of the at least one mobile robot.

5. The method of claim 1, wherein the at least one camera comprises a stereo camera system comprising at least two lenses, and wherein the stereo camera system is forward-facing with respect to a direction of motion of the at least one mobile robot.

6. The method of claim 1, wherein the at least one camera comprises at least two cameras, and wherein at least two of said cameras are sideways-facing with respect to a direction of motion of the at least one mobile robot.

7. The method of claim 1, further comprising the at least one mobile robot navigating on a walkway at least partially using the at least one hypothesis with the highest likelihood of representing the walkway boundary.

8. The method of claim 1, wherein the at least one hypothesis with the highest likelihood of representing the walkway boundary comprises an input of a navigation procedure of the at least one mobile robot.

9. The method of claim 1, wherein the at least one camera is adapted to acquire 1 to 10 images per second, more preferably 2 to 8 images per second, even more preferably 3 to 6 images per second.

10. The method of claim 1, wherein the extraction of the lines from at least one image is performed by applying an edge detector algorithm to the at least one image followed by a line extractor algorithm.

11. The method of claim 1, wherein the at least one mobile robot further comprises a processing component adapted to implement at least part of at least one of (b), (c) and (d), preferably all of (b), (c) and (d).

12. The method of claim 1, wherein the at least one mobile robot comprises at least one light-based range sensor and wherein the method further comprises the at least one light-based range sensor obtaining data and the ground plane being obtained using the data obtained by the at least one light-based range sensor.

13. The method of claim 1, wherein
(i) the at least one mobile robot has a width in the range of 20 to 100 cm, preferably 40 to 70 cm, such as about 55 cm.; and/or
(ii) the at least one mobile robot has a height in the range of 20 to 100 cm, preferably 40 to 70 cm, such as about 60 cm.; and/or
(iii) the at least one mobile robot has a length in the range of 30 to 120 cm, preferably 50 to 80 cm, such as about 65 cm.; and/or
(iv) the at least one mobile robot has a weight in the range of 2 to 50 kg, preferably 5 to 40 kg, more preferably 7 to 25 kg, such as 10 to 20 kg.;
and/or (v) the at least one mobile robot is adapted not to travel with a speed of more than 10 km/h, or more than 8 km/h, or more than 6 km/h.

14. A system comprising:
(a) at least one camera associated with at least one mobile robot, the at least one camera adapted to acquire at least one image; and
(b) at least one processing component constructed and adapted to at least extract a plurality of lines from the at least one image, create at least one dataset comprising data related to the plurality of lines extracted from the at least one image, and form a plurality of hypotheses for a walkway boundary based on the at least one dataset and determine at least one hypothesis with the highest likelihood of representing a walkway boundary;
wherein each line is categorized as either a left line or a right line with respect to the at least one mobile robot,
wherein the at least one processing component is further constructed and adapted to:
  make a left partial hypothesis based on the lines to the left of the at least one mobile robot and a right partial hypothesis based on the lines to the right of the at least one mobile robot;
  combine the partial hypotheses to make a full hypothesis; and
  assign a likelihood value to said full hypothesis,
  wherein the at least one dataset is formed by projecting the extracted lines on a certain projection plane, and wherein the certain projection plane comprises a ground plane defined with respect to the at least one mobile robot, and
  wherein for each particular line projected onto the ground plane, two points are extracted, preferably corresponding to endpoints of the particular line, and each of the partial hypothesis is based on a different collection of such points,
  wherein each of the partial hypothesis is formulated by applying a linear regression algorithm to a different collection of points,
  wherein the at least one processing component is further constructed and adapted to
  assign weights to the points for partial and full hypotheses likelihood calculation, the weights differing for at least two points,
  wherein the weights depend on a distance of the points from the at least one mobile robot.

15. The system of claim 14 wherein the mobile robot is constructed and adapted to use the most likely hypothesis as part of autonomous navigation on walkways.

16. The system of claim 14, wherein said at least one camera attached to the at least one mobile robot comprise a plurality of cameras, and wherein at least one of said plurality of cameras is forward-facing with respect to a direction of motion of the at least one mobile robot and at least one of said plurality of cameras is backward-facing with respect to the direction of motion of the at least one mobile robot.

17. The system of claim 14, wherein said at least one camera attached to the at least one mobile robot, and wherein said at least one camera comprises a stereo camera system comprising at least two lenses, and wherein the stereo camera system is forward-facing with respect to a direction of motion of the at least one mobile robot.

18. The system of claim 14, wherein the at least one mobile robot comprises at least one light-based range sensor.

19. The system of claim 14, wherein
(i) the at least one mobile robot has a width in the range of 20 to 100 cm, preferably 40 to 70 cm, such as about 55 cm.; and/or (ii) the at least one mobile robot has a height in the range of 20 to 100 cm, preferably 40 to 70 cm, such as about 60 cm.; and/or (iii) the at least one mobile robot has a length in the range of 30 to 120 cm, preferably 50 to 80 cm, such as about 65 cm.; and/or (iv) the at least one mobile robot has a weight in the range of 2 to 50 kg, preferably 5 to 40 kg, more preferably 7 to 25 kg, such as 10 to 20 kg.; and/or (v) the at least one mobile robot is adapted not to travel with a speed of more than 10 km/h, or more than 8 km/h, or more than 6 km/h.

20. A non-transitory computer-readable medium with one or more computer programs stored therein that, when executed by one or more processors, cause the one or more processors to perform at least the operations of:

(a) acquiring at least one image with at least one camera associated with at least one mobile robot; and (b) extracting a plurality of lines from the at least one image acquired in (a);

(c) creating at least one dataset comprising data related to the plurality of lines extracted from the at least one image in (b);

(d) forming a plurality of hypotheses for a walkway boundary based on the at least one dataset and determining at least one hypothesis with the highest likelihood of representing a walkway boundary; and (e) using the at least one hypothesis determined in (d) to navigate the at least one mobile robot;

wherein each line is categorized as either a left line or a right line with respect to the at least one mobile robot;

(f) making a left partial hypothesis based on the lines to the left of the at least one mobile robot and a right partial hypothesis based on the lines to the right of the at least one mobile robot;

(g) combining the partial hypotheses to make a full hypothesis;

(h) assigning a likelihood value to said full hypothesis, wherein the at least one dataset is formed by projecting the extracted lines on a certain projection plane, and wherein the certain projection plane comprises a ground plane defined with respect to the at least one mobile robot, and wherein for each particular line projected onto the ground plane, two points are extracted, preferably corresponding to endpoints of the particular line, and each of the partial hypothesis is based on a different collection of such points, wherein each of the partial hypothesis is formulated by applying a linear regression algorithm to a different collection of points; and (i) assigning weights to the points for partial and full hypotheses likelihood calculation, the weights differing for at least two points, wherein the weights depend on a distance of the points from the at least one mobile robot.

21. The computer-readable medium of claim 20, wherein the one or more processors comprises at least one CPU and at least one GPU.

22. The method of claim 1, wherein the walkway comprises a traversable region of ground.

23. The method of claim 22, wherein the walkway comprises: a sidewalk, a pedestrian path, a footpath, a passage, a track, or a trail.

24. The method of claim 1, wherein said using in (e) comprises using the at least one hypothesis to adjust a direction and/or speed of motion of the at least one mobile robot.

25. The method of claim 1, wherein the ground plane was determined as part of the creating in (c).

26. The method of claim 1, wherein hypotheses for the walkway boundary are based on data related to different subsets of lines extracted from the at least one image.

* * * * *